United States Patent [19]

Mader et al.

[11] Patent Number: 5,473,264

[45] Date of Patent: Dec. 5, 1995

[54] METHODS AND APPARATUS FOR ELECTRICALLY TERMINATING A HIGH SPEED COMMUNICATIONS PATHWAY

[75] Inventors: Thomas B. Mader, Boulder, Colo.; Dale Adams; Jano Banks, both of San Jose, Calif.

[73] Assignee: Apple Computer, Inc., Cupertino, Calif.

[21] Appl. No.: 976,094

[22] Filed: Nov. 13, 1992

[51] Int. Cl.$^6$ .................. H03K 17/16; H03K 19/0175
[52] U.S. Cl. .................. 326/30; 326/86; 326/90; 375/257; 333/32
[58] Field of Search .................. 326/30, 86, 90; 375/36; 333/32; 371/40.1; 340/825.5; 327/323; 307/147

[56] References Cited

U.S. PATENT DOCUMENTS

| | | | |
|---|---|---|---|
| 4,782,300 | 11/1988 | Bonaccio et al. | 324/509 |
| 5,057,783 | 10/1991 | Gubisch | 333/32 |
| 5,095,231 | 3/1992 | Sartori et al. | 326/30 |
| 5,120,909 | 6/1992 | Kutz et al. | 333/32 |
| 5,166,957 | 11/1992 | Lenoir | 326/30 |
| 5,187,454 | 2/1993 | Collins et al. | 333/32 |

FOREIGN PATENT DOCUMENTS

| 58317 | 3/1986 | Japan | 326/30 |
|---|---|---|---|

*Primary Examiner*—Edward P. Westin
*Assistant Examiner*—Richard Roseen
*Attorney, Agent, or Firm*—David J. Larwood

[57] ABSTRACT

A circuit arrangement and methods for sensing whether line terminator devices are present at terminal ends of high speed communications pathways, and enabling a switching terminator in accordance therewith, are disclosed. In one embodiment, the communications pathway comprises a Small Computer System Interface (SCSI) bus comprising internal and external bus segments and bus control lines, including a reset line consisting of internal and external reset line segments. First and second system reset signals are supplied from a central processor unit (CPU) to various system components. Line terminator devices may or may not be coupled to the ends of the internal and external bus segments. The first system reset signal is directed to first and second transistors coupled together in an "upside down" collector-to-emitter configuration comprising a two-quadrant bidirectional switch which opens upon assertion of the first system reset signal. The internal and external reset request lines are coLtpied to the collectors of the first and second transistors respectively, and further form inputs to a NAND gate. First and second resistors having impedances large relative to the impedance of line terminator devices are coupled as pull-down resistors between both internal and external reset request lines forming the inputs to the NAND gate and ground. The NAND gate together with the first and second resistors produce a DECISION output signal for the 4 different possible input combinations of SCSI bus terminations, DECISION being either "connect terminator" or "don't connect terminator". The DECISION output signal is latched or otherwise stored upon deassertion of the second system reset signal, and is subsequently routed to an enable pore of the switching terminator to engage the terminator element therein. The two-quadrant switch is closed upon deassertion of the second system reset signal, recoupling the internal and external reset lines.

24 Claims, 3 Drawing Sheets

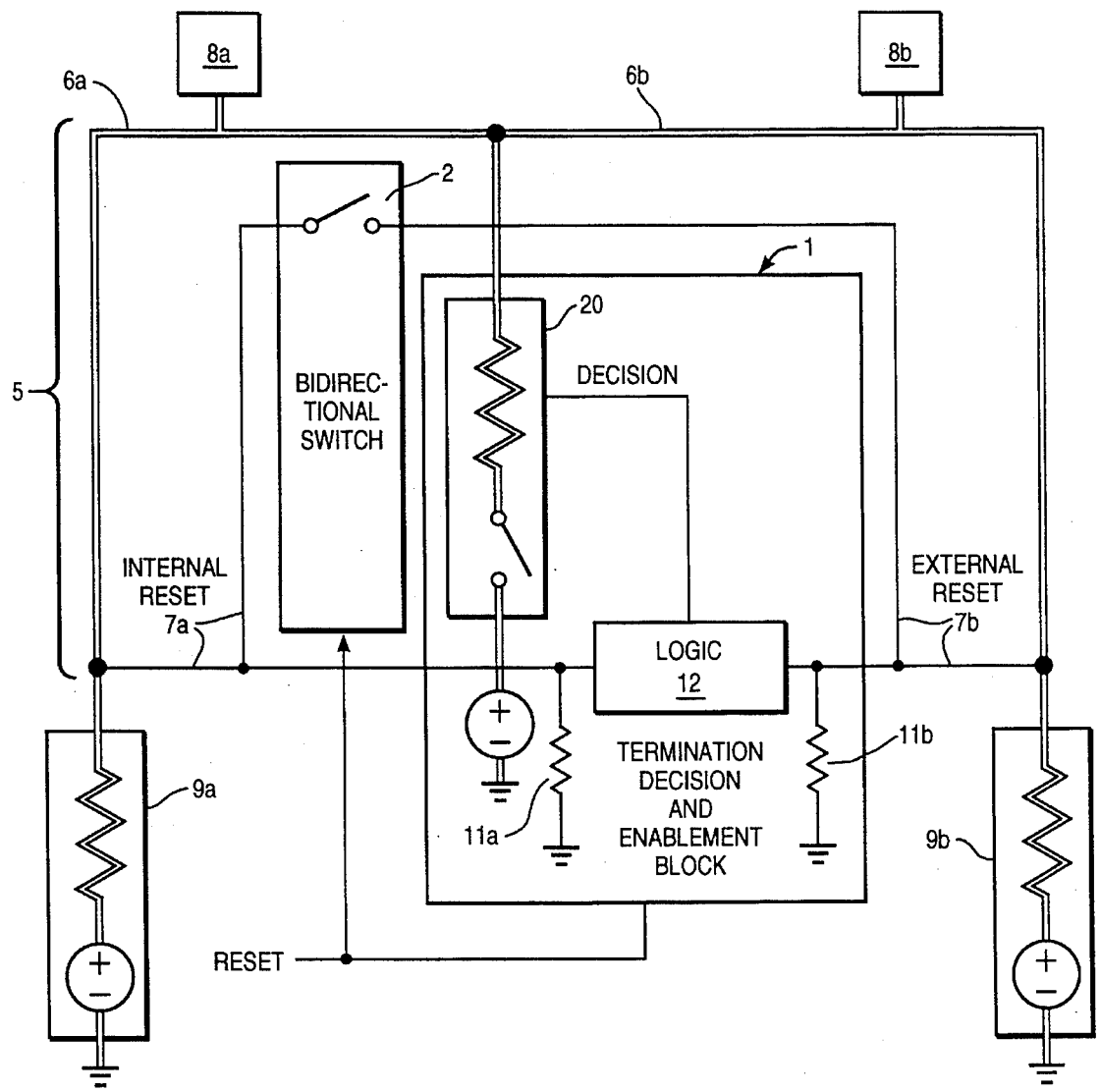
FIG_1

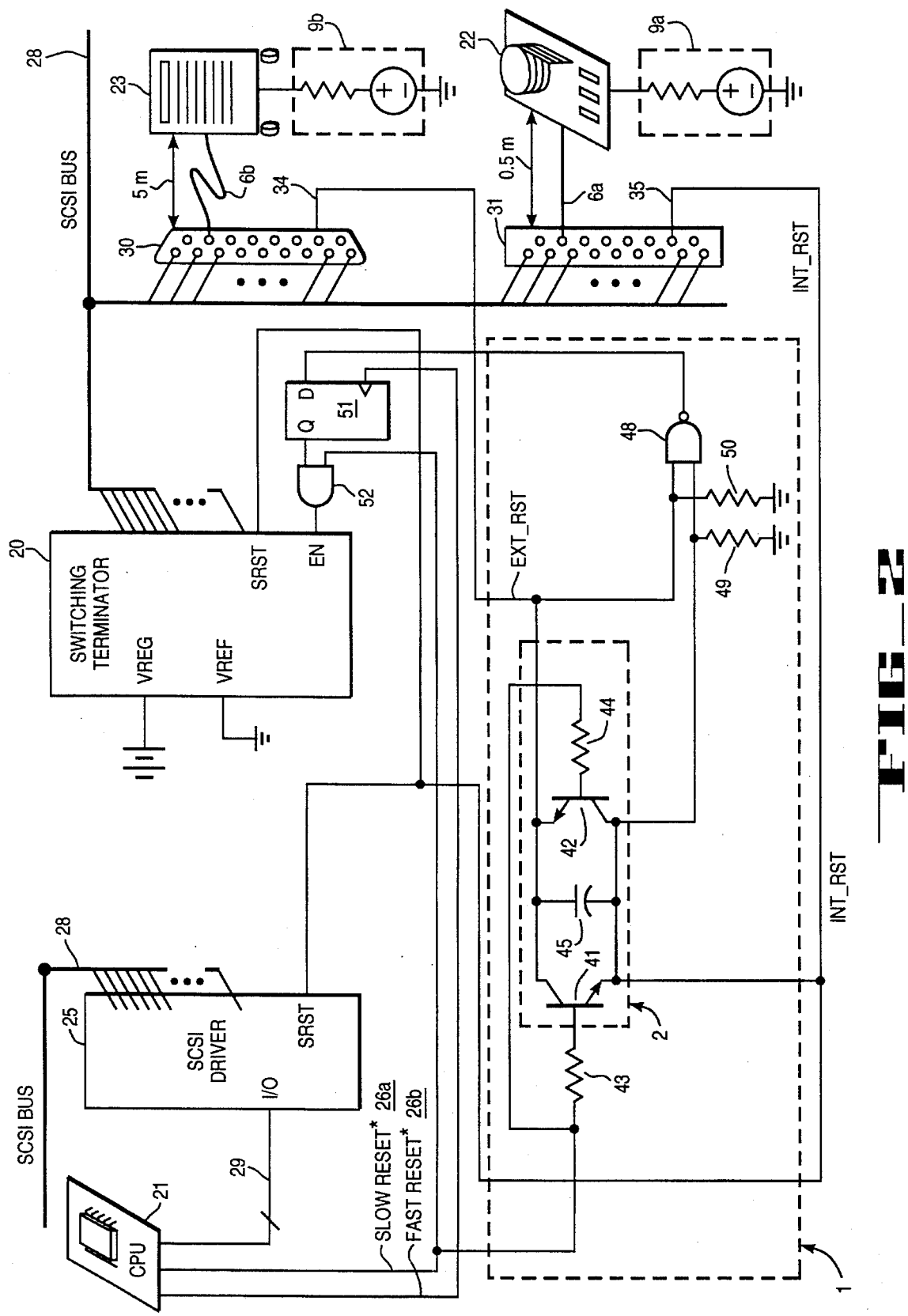
FIG_2

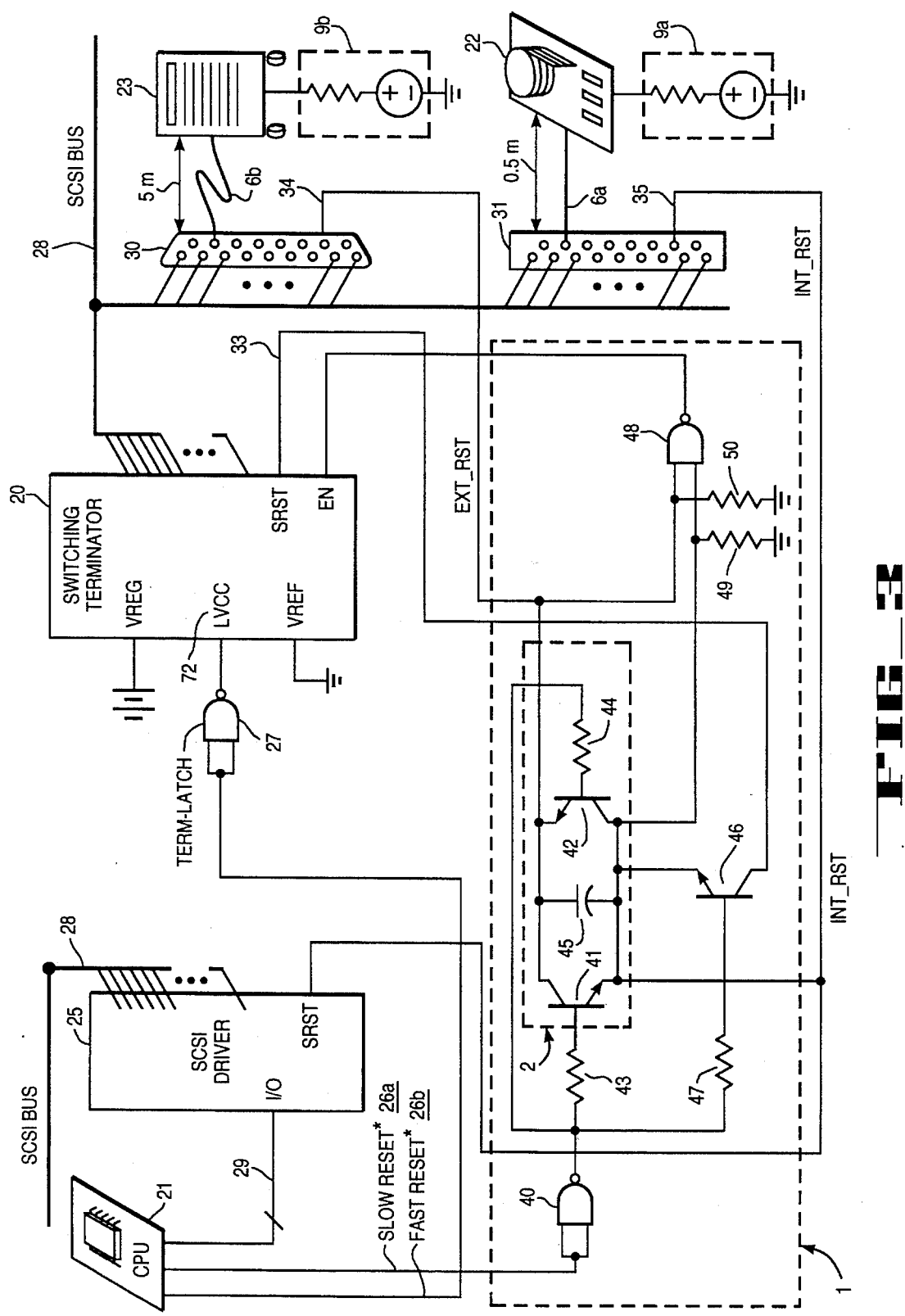
FIG_3

METHODS AND APPARATUS FOR ELECTRICALLY TERMINATING A HIGH SPEED COMMUNICATIONS PATHWAY

BACKGROUND OF THE INVENTION

1. Field of the Invention

The present invention relates generally to computer peripheral devices, and more particularly relates to a circuit arrangement for impedance-matching high frequency signal transmission media interconnecting such peripheral devices.

2. Art Background

Computer systems typically comprise numerous functional computational components and subsystems operating together to produce a desired result. A common arrangement of component subparts forming a computer system might include a central processor unit (CPU), memory devices, input and output (I/O) devices, and optional peripheral devices. The various functional subsystems communicate with each other over various forms of communication pathways. Communication pathways may comprise distributed shared pathways, for example buses, or may comprise dedicated private line pathways. In connection with smaller personal computers and standalone workstations, a common communications pathway is the well known and documented standard Small Computer System Interface (SCSI) bus.

Shared subsystems such as hard disk drives, I/O devices, and peripheral devices typically interact with the CPU over one or more system buses. In present day compact computer systems, for example a personal desktop computer, all memory components including hard disk drives typically are mounted internally within the computer case. in such a case, internal buses and communication lines interconnecting the various subsystems are fairly short, on the order of tens of centimeters. Alternatively, especially in high performance or multiple-user "server" platforms, memory or peripheral devices may be remotely located from the accessing CPU. In the latter case, the external interconnecting buses and communications pathways may become physically long, exceeding several meters.

Signal propagation in a communications pathway physically occurs along an electrically conductive element, e.g., a wire, and depends upon the frequency and length of the conductor. As operating speeds of computer systems increase, propagation of signals between the CPU and memory or peripheral devices over the communications pathways must be increasingly well controlled. For example, at relatively slow system clock and bus data rates, i.e., a few megahertz (MHz), signal propagation characteristics remain relatively independent of the conductor length, the signal waveform being adequately predicted and described by DC circuit analysis. At low frequencies, signals are fully absorbed at media discontinuities and at terminal ends of the conductor, and do not affect other functional subsystems coupled to the conductor, i.e., the bus.

However, as signal frequency increases, e.g., greater than 40 MHz, transmission characteristics are no longer independent of the conductor geometry, especially length. In particular, reflections of transmitted high frequency signals at conductor discontinuities and conductor terminations can create superimposed signals, and thereby cause unexpected results. For example, in the case of high frequency digital signals, consider the case where an incident logic "1", or "HIGH", signal is reflected from a conductor discontinuity or termination. Although the absolute voltage of the reflected signal may comprise a reduced voltage relative to the incident logic "1" signal, the reflected signal may nevertheless be sufficient to still comprise a logic "1" signal. In such a case, a device keying upon the signal could be counted or "clocked" twice: once upon the incident signal, and again upon the reflection. Unexpected or fatal computer malfunctioning may likely follow.

To preclude instances of reflected signals causing data transmission errors in high frequency data communications pathways, line terminators were developed to match the impedance of the transmission line and thus provide a nonreflecting, i.e., an "absorbing", termination to the transmission line. Line terminators are coupled to terminal ends of transmission pathways (e.g., buses) so that signals transmitted on pathways that ordinarily would have open terminations, are fully absorbed at the terminal end of the the pathway. By providing terminators at terminal ends of a bus interconnecting one or more subsystems, reflections on the bus are minimized or precluded altogether, thereby ensuring reliable operation of functional subsystems operating on the bus.

Although the function of terminators is easily described, determining when to use line terminators proves difficult in practice. The foregoing is principally true because a system user must physically attach or detach a line terminator to internal and external segments of the bus depending upon certain signal transmission conditions, which conditions are often not easily ascertained by the user. For example, if no disk drive is connected at the terminal end of an external SCSI bus segment, a line terminator should be attached to prevent undesirable reflections from the unterminated bus end. Alternatively, if the SCSI bus segment is short relative to the signal frequency, e.g., an internal SCSI bus segment interconnecting only one internal peripheral device, a terminator is not required to prevent reflections. Generally, however, one terminator is necessary to act as a pull-up device for the SCSI bus regardless of the length of the SCSI bus. If a user wishes to connect a disk drive to the terminal end of a SCSI bus already terminated by a line terminator, the user must first disconnect the terminator and then connect the disk drive.

More recently, switching terminators have been developed which electrically connect or disconnect a terminator circuit element from the signal pathway, without requiring physical intervention by the user. An example of such a switching terminator is the model MCCS142235, manufactured by Motorola, Inc., Schaumberg, Ill. However, a user must still make a determination whether to engage the terminator in the first instance, and then activate or deactivate the switching terminator accordingly. Further, although software interfaces could be written to enable the switching terminator as necessary, the additional layer of code required to run on the system processor is cumbersome and would be implementation-specific.

As will be described in the following detailed description, the present invention overcomes many of the problems associated with the prior art by providing a voltage sensing circuit arrangement for automatically sensing whether line terminator devices are present at terminal ends of a internal and external interconnecting communications pathways, and thereafter enabling or disabling a switching terminator in accordance with the results of the voltage sensing circuit. The sensing circuit arrangement permits a computer system to automatically adapt high speed communications pathways according to user-implemented configurations, thereby ensuring reliable data signal transmission and subsystem operation without requiring intervention by the user.

SUMMARY OF THE INVENTION

A circuit arrangement and methods for automatically sensing whether line terminator devices are present at terminal ends of high speed interconnecting communications pathways, and enabling a switching terminator in accordance therewith, are disclosed. In one embodiment, the communications pathway comprises a Small Computer System Interface (SCSI) bus comprising internal and external bus segments having a first (internal) SCSI connector and a second (external) SCSI connector. The SCSI bus further comprises bus control lines, including a reset line consisting of an internal reset line segment and an external reset line segment. The SCSI bus is driven by a SCSI driver circuit and interconnects one or more internal or external peripheral devices coupled to the internal and external bus segments. First and second system reset signals are supplied from a central processor unit (CPU) to various system components. Line terminator devices may or may not be coupled to the ends of the internal and external bus segments.

The first system reset signal is directed to a two-quadrant bidirectional switch which connects and disconnects the internal and external reset line segments. In one embodiment, first and second npn transistors coupled together in an "upside down" collector-to-emitter configuration comprise the two-quadrant bidirectional switch, the first system reset signal being directed to the bases of the first and second transistors. The internal reset request line from the internal SCSI connector is further coupled to the collector of the first transistor. The external reset request line from the external SCSI connector is coupled to the collector of the second transistor.

The internal and external reset request signals further form inputs to a NAND gate. First and second resistors having impedances large relative to the impedance of line terminator devices are coupled as pull-down resistors between both internal and external reset request lines forming the inputs to the NAND gate and ground. The NAND gate together with the first and second resistors produce a DECISION output signal for the 4 different possible input combinations of SCSI bus terminations, DECISION being either "connect terminator" or "don't connect terminator". The DECISION output signal is latched or otherwise stored upon deassertion of the second system reset signal, and is subsequently routed to an enable port of the switching terminator to engage the terminator element therein.

In a second, preferred embodiment, the first system reset signal is coupled to the base of a third npn transistor used to disconnect the switching terminator from the SCSI bus reset line when the first system reset signal has been issued to reset the bus. Further, latching of the DECISION output signal is accomplished using the switching terminator itself as a latch, wherein the "connect terminator" DECISION output signal is delivered directly to an enable input to the switching terminator. The second system reset signal is coupled to a low voltage condition sensing input of the switching terminator.

Following assertion of first and second system reset signals, the two-quadrant switch is opened by applying a "low" logic voltage to the bases of both first and second transistors, thereby disconnecting, or "opening", the internal and external reset request lines from each other. If internal or external terminators are connected to the ends of the internal and external bus segments of the SCSI bus, a finite positive bus voltage will appear at the respective input to the NAND gate, as supplied by the respective internal or external reset request line. Alternatively, if no internal or external terminators are connected, the bus voltage will be pulled to ground via the appropriate high impedance pull-down resistor. Thus, a determination whether the switching terminator should or should not be enabled can be made transparent to the user based upon the magnitude of bus voltage measured on the internal and external reset request lines. The switching terminator is thereafter enabled or not in accordance with the DECISION output signal front the NAND gate. Finally, the two-quadrant switch is closed upon deassertion of the second system reset signal by delivering a positive voltage to the bases of both first and second transistors.

BRIEF DESCRIPTION OF THE DRAWINGS

The present invention will be understood more fully from the detailed description given below and from the accompanying drawings of the preferred embodiment of the invention in which:

FIG. 1 illustrates a simplified block diagram view of a Small Computer System Interface (SCSI) bus incorporating the terminator sensing and switching features of the present invention.

FIG. 2 illustrates a detailed schematic view of the SCSI bus terminator sensing and switching apparatus according to a first embodiment of the present invention.

FIG. 3 illustrates a detailed schematic view of the SCSI bus terminator sensing and switching apparatus according to a second preferred embodiment of the present invention.

DETAILED DESCRIPTION OF THE INVENTION

The present invention discloses methods and apparatus for automatically determining when a Small Computer System Interface (SCSI) bus should be equipped with line terminator devices, and thereafter coupling a switching terminator to the bus in accordance with such determination. In the following description, for purposes of explanation, specific numbers, times, dimensions, and configurations are set forth in order to provide a thorough understanding of the present invention. However, it will be apparent to one skilled in the art that the present invention may be practiced without these specific details. In other instances, well known systems are shown in diagrammatical or block diagram form in order not to obscure the present invention unnecessarily.

The present invention generally comprises two portions. The first portion comprises a termination decision and enablement block which is activated upon system startup or reset. The termination decision and enablement block determines whether line terminator devices are coupled to the SCSI bus when a particular segment of the bus is electrically "open", thereafter engages a switchable terminator if necessary. The second portion comprises a two-quadrant bidirectional switch which serves to electrically open a portion of the SCSI bus to permit testing by the termination decision and enablement block, and thereafter electrically closes the previously opened segment of the SCSI bus to permit normal bus operation.

Reference is now made to FIG. 1, wherein the the first portion of the present invention, a termination decision and enablement block 1, is implemented upon a SCSI bus 5. For purposes of the detailed description which follows, SCSI bus 5 is implemented and arranged according to well known principles. In FIG. 1, a number of signal lines are bundled together to form SCSI bus 5, including an internal bus segment 6a, an external bus segment 6b, an internal reset line 7a, and an external reset line 7b. For purposes of implementing the features of the present invention, internal and external reset lines 7a and 7b are electrically "opened" at system startup or reset and thereafter electrically "closed" within a bidirectional switch 2. The description and operation of bidirectional switch 2 will be described more fully below. Coupled to internal bus segment 6a is internal peripheral device 8a intended to operate on the SCSI bus 5 within the interior of a computer system (not shown). Conversely, coupled to external bus segment 6b is an external peripheral device 8b intended to operate on the bus 5. Internal and external devices 8a and 8b are intended to represent any of various peripheral devices intended to operate in conjunction with a central processor unit (CPU), not shown, which peripheral devices may include magnetic disk or tape storage devices, printers, scanners, etc.

As is frequently the case, internal peripheral device 8a is located in much greater proximity to the terminal end of internal bus segment 6a than external device 8b is located to the terminal end of external bus segment 6b. For example, internal device 8a may consist of a hard disk magnetic storage device mounted within several centimeters of the CPU internally within an enclosure. Alternatively, external device 8b may consist of a high capacity shared disk located several meters away from the accessing computer. Note that according to published SCSI specifications, the maximum length of a SCSI bus should not exceed six meters. An impedance-matching internal line terminator 9a and an external line terminator 9b may be coupled to the internal and external terminal ends of bus segments 6a and 6b, and devices 8a and 8b, respectively. However, within the context of the present invention, it must be specifically noted that it is not necessary that line terminators 9a and 9b be present. Instead, the present invention is specifically intended to detect whether such terminators (9a or 9b) are connected, and to determine when a switching terminator 20, located within the termination decision and enablement block 1 of the present invention, is to be enabled.

The internal reset line 7a is routed to one input of termination decision and enablement block 1, there being a high impedance resistor 11a connected between reset signal line 7a and ground. Similarly, the external reset signal 7b is routed to a second input of termination decision block 1, there also being a high impedance resistor 11b connected between reset signal line 7b and ground. Termination decision and enablement block 1 further contains a logic unit 12, which in combination with resistors 11a and 11b delivers a DECISION output signal to switching terminator 20. To ensure proper functionality in the present invention, the impedance of resistors 11a and 11b should be large relative to the impedances of terminators 9a and 9b connected to either the internal or external bus segments 6a and 6b of SCSI bus 5. As will be discussed in association with the alternative embodiments of the present invention shown in FIG. 2 and FIG. 3 below, resistors 11a and 11b comprise 10 KΩ resistors, whereas the impedances of terminators 9a and 9b typically comprise 110 Ω.

In operation, a determination by termination decision and enablement block 1 whether either internal or external bus segment 6a or 6b of bus 5 is terminated is accomplished by testing the voltage appearing at the open circuit terminations of internal and external reset request lines 7a and 7b. The four possible input combinations to termination decision and enablement block 1 are:

both the internal and external bus segments 6a and 6b have terminators attached, either the internal bus segments 6a or the external bus segments 6b has a terminator attached, or neither the internal nor the external bus segments 6a and 6b have terminators attached.

If a line terminator device (9a or 9b) is not attached to either bus segment 6a or 6b, the respective high impedance resistor (11a or 11b) will be the only conductive path available through which electrical signals may travel. Thus, the voltage of bus segments 6a and 6b as measured at the inputs to logic gate 12 will be pulled down to ground by the corresponding high impedance resistor (11a or 11b). Alternatively, if a line terminator device (9a or 9b) is attached to either bus segments 6a or 6b, the pull-down effect of the corresponding high impedance resistor (11a or 11b) will be ineffective relative to the lower impedance of the respective line terminator. If a 0 volt condition is measured it will be known that no line terminator is connected, and that switching terminator 20 should be enabled.

For example, assume that both internal bus segment 6a and external bus segment 6b are properly terminated by line terminators 9a and 9b. Assume further that the open circuit voltage of peripheral devices 8a and 8b coupled to internal and external bus segments 6a and 6b is 2.85 volts. In such a case, the voltage appearing at the open circuit points for both the internal and external reset lines 7a and 7b will be 2.85 v minus any voltage drop associated with the impedance of line terminators 9a and 9b, or some net positive voltage. The DECISION signal appearing at the output of logic block 12 will then comprise a "don't connect terminator" signal.

Alternatively, as a second example, assume that the internal bus segment 6a is terminated by line terminator 9a, but that no terminator 9b is connected to the external bus segment 6b. Assume again that the open circuit voltage of connected peripheral devices is 2.85 v. In such a case, the voltage appearing at the open circuit point for the internal reset line 7a will again be 2.85 v minus any voltage drop associated with the line terminator 9a, or some net positive voltage. However, the voltage appearing at the open circuit point for the external reset line 7b will be 0 v because the open circuit voltage is pulled down by high impedance resistor 11b. In this second case, the DECISION signal appearing at the output of termination decision block 1 will comprise a "connect terminator" signal. In the latter case, the DECISION signal enables the switching terminator 20, thereby coupling switching terminator 20 into the internal and external bus segments 6a and 6b of SCSI bus 5.

Referring now to FIG. 2, an illustration of a first alternative embodiment of the present invention applied to the SCSI bus 5. In FIG. 2, a collection of SCSI bus lines 28, an internal device reset request line 35, and an external device reset request line 34 together form bus 5. A SCSI driver device 25 typically comprising an application specific integrated circuit (ASIC) is coupled between SCSI bus lines 28 and a central processing unit (CPU) 21 via a collection of input and output (I/O) lines 29. SCSI driver 25 controls requests for access to SCSI bus lines 28 and other overhead functions associated with transmitting messages over such data lines. Connected to SCSI bus lines 28 is an internal connector 31, to which is coupled an internal peripheral device 22 (typically a mass storage device) intended to communicate with CPU 21 over the internal bus segment 6a and SCSI bus lines 28. Similarly, connected to SCSI bus lines 28 is an external connector 30, to which is typically connected an external peripheral device 23 intended to communicate with CPU 21 over external bus segment 6b and SCSI bus lines 28. As previously discussed in connection with FIG. 1 above, internal and external peripheral devices 22 and 23 may include any of various magnetic disk or tape storage devices, printers, scanners, etc.

As stated above, internal peripheral device 22 operating on the SCSI bus lines 28 (SCSI bus 5) is frequently located in such greater proximity to internal connector 31 than is located external peripheral device 23 to external connector 30. For example, device 22 may consist of an internal hard disk magnetic storage device located only tens of centimeters from internal connector 31, whereas external device 23 may consist of a high capacity shared disk located several meters away front external connector 30. Impedance-matching line terminators 9a and 9b may be coupled to the terminals ends of internal and external bus segments 6a and 6b, respectively as shown. Recall however, that within the context of the present invention it is not necessary that line terminators 9a and 9b be present. Instead, the present invention is specifically intended to detect whether such terminators are connected, and to enable switching terminator 20 when either terminator 9a or 9b is not connected.

Still referring to FIG. 2, a first system reset line 26a distributes a SLOW RESET* signal front CPU 21 to terminator decision and enablement block 1, and bidirectional switch 2, where "*" indicates that SLOW RESET* is asserted upon a HIGH-to-LOW transition. The SLOW RESET* signal, when asserted to logic "0", or "LOW", will cause switch 2 to electrically "open" when the computer is reset. Furthermore, a second system reset line 26b distributes a FAST RESET* signal from CPU 21 to a flip-flop 51. The FAST RESET* reset signal is "fast" relative to SLOW RESET* signal in that when both signal lines 26a and 26b are asserted, signal line 26b (FAST RESET*) returns to an inactive state faster that signal line 26a (SLOW RESET*). However, the skilled reader will appreciate that the SLOW RESET* and FAST RESET* signals could equally well comprise LOW-to-HIGH transitioning signals with no resultant loss in functionality. Therefore, the terms "asserted" and "deasserted" will be used to indicate active and inactive states respectively, without regard to the specific logic implementation illustrated by the alternative embodiments shown in the present invention.

Within terminator decision and enablement block 1, the SLOW RESET* signal from CPU 22 is coupled to first and second transistors 41 and 42 via resisters 43 and 44. The collectors of each of transistors 41 and 42 are coupled to the emitters of each of transistors 42 and 41 respectively, thereby forming an "upside-down" transistor pair. The function of transistors 41 and 42 is to configure bidirectional switch 2 (FIGS. 1 and 2) as a two-quadrant switch, the function of which permits current to flow equally well in opposite directions within switch 2. Resisters 43 and 44 are chosen so as to adjust the base drive voltage applied to transistors 41 and 42, and thereby provide an appropriate voltage at the collectors of transistors 41 and 42 as necessary. As presently preferred, transistors 41 and 42 comprise 2N2222 npn-type transistors. However, alternative implementations of the present invention may be achieved using other switching devices, for example pnp transistors, metal-oxide-semiconductor field effect transistors (MOSFETs), or relays. Also in the embodiment shown in FIG. 2, resisters 43 and 44 comprise 2.55 kilohm (KΩ) resisters.

Switchable terminator 20 is connected to all SCSI bus lines 28, and is enabled via a 2-input NAND logic gate 48 driven by voltage levels residing on internal and external reset lines 35 and 34 forming the inputs to NAND gate 48. The internal device reset request signal sent on line 35 via internal connector 31 is routed to one input of NAND gate 48, there being a high impedance resistor 49 between line 35 and ground. Similarly, the external reset request signal sent on line 34 via external connector 30 is routed to the second input of NAND gate 48, there also being a high impedance resistor 50 between line 34 and ground. The single output of NAND gate 48 comprises a DECISION output signal, as previously shown for logic block 12 in FIG. 1 above. As pertained to the device discussed in connection with FIG. 1, to ensure proper functionality in the present invention, the impedance of resistors 49 and 50 should be sufficiently large relative to the impedances of terminators 9a or 9b connected to peripheral devices connected to either the internal or external portions of SCSI bus lines 28, such that no current flows in resistors 49 and 50 if terminators 9a or 9b are present. As presently preferred, resistors 49 and 50 comprise 10 KΩ resistors, which is large compared to the impedances of terminators 9a and 9b (typically 110 Ω).

However, in order to permit NAND logic gate 48 to receive steady input signals and thus make a valid determination whether switching terminator should be enabled, it is desireable to latch or otherwise store the state of the DECISION signal when the SLOW RESET* signal was issued. The foregoing is true because the input signals to NAND gate 48 are directly influenced by the present state of switching terminator 20, depending on whether switching terminator 20 is enabled. If switching terminator 20 is enabled immediately upon reset, the impedance load of the terminator element within switching terminator 20 will be coupled to internal and external reset lines 35 and 34 forming the inputs to NAND gate 48, thus affecting the voltage appearing at the inputs to the decision-making logic (NAND gate 48 discussed below, and logic gate 12 (FIG. 1) discussed above). As is known, a storage device in the nature of a common latch can be used to store the DECISION output signal used to enable switching terminator 20. In particular, the latch employed stores the DECISION output signal before the DECISION output signal is altered by the impedance load presented by switching terminator 20 and coupled to the internal and external reset lines 35 and 34 when switching terminator 20 is enabled. As shown in FIG. 2, a D-type flip-flop 51 or the like can be coupled to receive the DECISION output from NAND gate 48 when FAST RESET* is deasserted, FAST RESET* being taken from CPU 21 and coupled to the clock input of flip-flop 51. The latched output from flip-flop 51 can then be coupled into one input of a 2-input AND gate 52 which is also coupled to receive SLOW RESET*. AND gate 52 uses SLOW RESET* as a toggle signal, and serves to disable switching terminator 20 while the DECISION signal is formulated.

Significantly, however, switchable terminator 20 itself also may provide an internal latching function to indicate when the SLOW RESET* signal has been issued. The latching function of switching terminator 20 will be described in more detail in following paragraphs in connection with FIG. 3 below.

A small capacitance capacitor 45 spanning the collector-emitter junctions for transistors 41 and 42 functions as a charge reservoir, such that electrons can immediately flow in the appropriate direction even though the corresponding transistor (either 41 or 42) is not yet fully forward-biased and therefore the full output current has not yet been achieved. As presently preferred, capacitor 45 comprises a 100 picofarad (pF) capacitor.

In operation, NAND gate 48 in FIG. 2 implements the logical functionality represented by logic gate 12 in FIG. 1. The determination by NAND gate 48 whether switchable terminator 20 should be enabled is accomplished by testing the voltage appearing at the open circuit terminations of internal reset line 35 and external reset line 34 at the inputs to NAND gate 48. As before, the four possible input combinations to NAND gate 48 are: both the internal and external bus segments 6a and 6b have terminators attached, either the internal bus segments 6a or the external b/is segments 6b has a terminator attached, or neither the internal nor the external bus segments 6a and 6b have terminators attached. If a line terminator device (9a or 9b) is not attached to internal or external bus segments 6a and 6b, any voltage supplied to a peripheral device (either device 22 or 23) as measured at the open circuit point (the inputs to NAND gate 48) will be pulled down to ground by the respective high impedance resistor (49 or 50) and that switching terminator 20 should not be enabled by sending the "don't connect terminator" DECISION signal (logic "0", or LOW) to the enable input of switching terminator 20.

Alternatively, if a line terminator device (9a or 9b) is attached to either connector 31 or 30, the respective high impedance resistor (49 or 50) will shunt negligible current to ground relative to the lower impedance of the line terminator, and therefore will remain a net positive voltage at the input to NAND gate 48. If a 0 volt condition is measured it will be known that no line terminator is connected, and that switching terminator 20 should be enabled by sending the "connect terminator" DECISION signal (logic "1", or HIGH) to the enable input of switching terminator 20.

For example, assume that both the internal and external connectors 31 and 30 are terminated by line terminators 9a and 9b. Assume further that the open circuit voltage is 2.85 volts. In such a case, the voltage appearing on both internal and external reset lines 35 and 34 as seen by NAND gate 48 will be 2.85 v minus any voltage drop associated with the impedance of line terminators 9a and 9b, or some net positive voltage. Because both inputs are positive voltages in excess of the minimum necessary to comprise a logical "1", the result will be a logical "0" DECISION signal appearing at the output of NAND gate 48 will comprise a "don't connect terminator" signal, and will be latched in flip-flop 51 upon the LOW-to-HIGH transition of FAST RESET* acting as the clock. Thereafter, the logic "0" will be gated to the enable input of switching terminator 20 upon the next occurring LOW-to-HIGH transition of SLOW RESET*. The "don't connect terminator" DECISION signal (logic "0") delivered to the enable input of switching terminator 20 will not enable the switch, and switching terminator 20 remains disconnected from SCSI bus lines 28.

Alternatively, assume that the internal connector 31 is terminated by line terminator 9a, but no terminator 9b is connected to the external connector 30. Assume again that the open circuit voltage is 2.85 volts. In such a case, the voltage appearing on the internal reset line 35 at the input to gate 48 will be 2.85 v minus any voltage drop associated with the line terminator 9a, or some net positive voltage, as in the example immediately above. However, the voltage appearing at the open circuit point for the external reset line 34 at the input to gate 48 will be 0 v because the open circuit voltage is pulled down by high impedance resistor 50. Because the input corresponding to the internal reset line 35 is a positive voltage in excess of the minimum to comprise a logical "1", and the input corresponding to the external reset line 34 is 0 v comprising a logical "0", the result will be a logical "1" appearing at the DECISION output of NAND gate 48. The logical "1" DECISION signal appearing at the output of NAND gate 48 will comprise a "connect terminator" signal, and will be latched in flip-flop 51 upon the LOW-to-HIGH transition of FAST RESET* acting as the clock. Thereafter, the logic "1" will be gated to the enable input of switching terminator 20 upon the next occurring LOW-to-HIGH transition of SLOW RESET*, and thus connect switching terminator 20 to SCSI bus lines 28.

Reference is now made to FIG. 3, wherein a preferred second alternative embodiment of the present invention is shown. The second embodiment is preferred because it eliminates several external hardware gates by taking advantage of specific features of the Motorola model MCCS142235 switching terminator. In the second alternative embodiment shown in FIG. 3, the output of inverting NAND gate 40 further is coLtpied via a resistor 47 to the base of a third transistor 46 acting as a switch to disconnect switching terminator 20 from SCSI internal reset line 35. The function of transistor 46 is thus identical to that served by AND gate 52 in FIG. 2 above. The emitter of transistor 46 is coupled to the collector-emitter pair of transistors 41 and 42 driven by a SLOW RESET system reset signal from CPU 21. Note particularly that SLOW RESET signal in FIG. 3 is asserted in an opposite, logic "LOW-to-HIGH" sense from the SLOW RESET* signal discussed in relation to FIG. 2 above. The en-titter of transistor 46 is further coupled to internal reset line 35. The collector of transistor 46 is coupled to switchable terminator 20. Similarly to resistors 43 and 44 above, resistor 47 controls the base drive of transistor 46, and therefore sets the output voltage appearing at the collector of transistor 46. Also as above, transistor 46 in the preferred embodiment comprises a 2N2222 npn-type transistor, and resistor 47 comprises a 2.55 resistor. When SLOW RESET is asserted (logic HIGH), transistor 46 is turned off, thereby disconnecting switching terminator 20 from the internal SCSI reset request line 35. Transistor 46 will again become active when SLOW RESET returns to its deasserted (logic LOW) state.

Also shown in FIG. 3, switching terminator 20 is designed to store the state of the ENABLE signal applied to the enable port of switching terminator 20 whenever a low-voltage condition signal is applied to a low-voltage condition latch port 72. In FIG. 3, FAST RESET* signal from the CPU 21 is coupled to both inputs of a third 2-input NAND gate 27. The output of NAND gate 27 is an inverted FAST RESET* signal, and provides a latch-clocking signal TERM_LATCH to low-voltage condition latch port 72 of switching terminator 20. In the second embodiment shown in FIG. 3, need for extra external latching devices is obviated by using latch port 72 within the switching terminator 20 because terminator 20 itself provides the latching or storage means to store the state of the ENABLE signal when SLOW RESET is asserted. After switching terminator 20 has been "opened", the switching terminator 20 will again "close" upon receipt of the proper enabling signal from NAND gate 48.

The foregoing has described methods and apparatus for automatically determining when a Small Computer System Interface (SCSI) bus should be equipped with line terminator devices, and enabling same. Thus configured, the termination detection circuit operates to determine whether line terminators exist on internal or external devices connected to a SCSI bus, and then automatically enabling a switchable terminator according to whether line terminators have been installed, without requiring user intervention. Although the foregoing has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

We claim:

1. In a computer system including a central processor unit (CPU) communicating with internal and external peripheral devices over internal and external bus segments of a Small Computer System Interface (SCSI) bus, a terminator detection and switching system comprising:

terminator detection means coupled to said internal and external bus segments for determining when line terminators are connected to said internal and external bus segments;

switching terminator means coupled to said internal and external bus segments for switchably engaging a matched impedance termination element to said internal and external bus segments; and, bidirectional switch means coupled to said CPU and said terminator detection means for switchably connecting said internal bus segment to said external bus segment.

2. The terminator detection and switching system as set forth in claim 1, wherein said switching terminator means further comprises:

a switching terminator;

terminator enabling means coupled to said terminator detection means and to said switching terminator, said terminator enabling means receiving a DECISION output signal from said terminator detection means and producing an ENABLE signal to enable said switching terminator; and, terminator isolation means for switchably connecting said switching terminator to said internal and external bus segments, said terminator isolation means coupled to receive at least one system signal from said CPU.

3. The terminator detection and switching system as set forth in claim 2, wherein said terminator detection means comprises:

a first NAND gate having first and second inputs;

said first input of said first NAND gate coupled to an internal reset request line and receiving an internal reset request signal;

said second input of said first NAND gate coupled to an external reset request line and receiving an external reset request signal;

first voltage sensing means coupled to said first input of said first NAND gate for determining whether an internal terminator is connected to said internal reset request line; and, second voltage sensing means coupled to said second input of said first NAND gate for determining whether an external terminator is connected to said external reset request line.

4. The terminator detection and switching system as set forth in claim 3, wherein said first voltage sensing means comprises a first pull-down resistor coupled to the first input of said NAND gate such that said internal reset request line is pulled to ground if a first terminator is not connected to said internal reset request line.

5. The terminator detection and switching system as set forth in claim 4, wherein said second voltage sensing means comprises a second pull-down resistor coupled to the second input of said first NAND gate such that said external reset request line is pulled to ground if a second terminator is not connected to said external reset request line.

6. The terminator detection and switching system as set forth in claim 5, wherein said system signals comprise:

a first system reset line coupled from said CPU to said bidirectional switch means, said first system reset line transmitting a first system reset signal such that said bidirectional switch means opens;

and, a second system reset line coupled from said CPU to said switching terminator means, said second system reset line transmitting a second system reset signal such that said DECISION signal is stored after said bidirectional switch means has opened.

7. The terminator detection and switching system as set forth in claim 6, wherein said bidirectional switch means comprises:

a first transistor having a first base, a first collector, and a first emitter;

said first base of said first transistor coupled via a first resistor to said first system reset line, the first collector of said first transistor coupled to said internal reset request line, the first emitter of said first transistor coupled to said external reset request line whereby said first transistor conducts current in a first direction between said internal and external bus segments;

and, a second transistor having a second base, a second collector, and a second emitter;

said second base of said second transistor coupled via a second resistor to said first system reset line, the second collector of said second transistor coupled to said external reset request line, the second emitter of said second transistor coupled to said internal reset request line whereby said second transistor conducts current in a second direction between said internal and external bus segments;

wherein said bidirectional switch means switchably connects said internal bus segment to said external bus segment.

8. The terminator detection and switching system as set forth in claim 7, wherein said first system reset signal comprises a SLOW RESET* signal, said bidirectional switch means opening when a logical HIGH-to-LOW transition of SLOW RESET* is received.

9. The terminator detection and switching system as set forth in claim 7, further comprising a second NAND gate coupled to receive said first system reset signal;

said second NAND gate having an output coupled to said first and second resistors coupled to said first and second transistors of said bidirectional switch means;

said first system reset signal comprising a SLOW RESET signal, said bidirectional switch means opening when a logical LOW-to-HIGH transition of SLOW RESET is received.

10. The terminator detection and switching system as set forth in claim 7, wherein said terminator enabling means further comprises:

latching means coupled to the output of said first NAND gate for receiving said DECISION signal, said latching means storing said DECISION signal when said second system reset signal is received by a latch clocking means;

and, an enable gate coLtpied to said latching means, said first system reset line, and said switching terminator, said enable gate receiving the DECISION signal stored in said latching means and generating an ENABLE signal disabling said switching terminator when said enable gate detects said first system reset signal.

11. The terminator detection and switching system as set forth in claim 9, wherein said terminator isolation means comprises:

a third transistor having a third base, a third collector, and a third emitter, said third base coupled via a third resistor to the output of said second NAND gate, said third collector coupled to said switching terminator, said third transistor decoupling said switching terminator from said internal reset request line when said SLOW RESET signal is inverted by said second NAND gate;

and a third NAND gate coupled to receive said second system reset signal and having an output coupled to a latching input of said switching terminator;

12. The terminator detection and switching system as set forth in claim 11, wherein said second system reset signal comprises a FAST RESET* signal;

said third NAND gate thereafter inverting said FAST RESET* signal to transmit a TERMINATOR-LATCH signal to said latching input of said switching terminator when said FAST RESET* signal undergoes a LOW-to-HIGH transition;

said switching terminator thereafter internally latching the DECISION signal after a LOW-to-HIGH transition of FAST RESET* is received by said latching input of said switching terminator.

13. In a computer system including a central processor unit (CPU) communicating with internal and external peripheral devices over internal and external bus segments of a Small Computer System Interface (SCSI) bus, a method for detecting the presence of line terminators, said method comprising the steps of:

providing terminator detection means coupled to said internal and external bus segments for determining when line terminators are connected to said internal and external bus segments;

switchably engaging a matched impedance termination element to said internal and external bus segments by providing switching terminator means coupled to said SCSI bus;

and, switchably connecting said internal bus segment to said external bus segment by providing bidirectional switch means coupled to said CPU and said terminator detection means.

14. The method according to claim 13, wherein providing said switching terminator means further comprises:

providing a switching terminator;

coupling terminator enabling means to said switching terminator;

receiving a DECISION output signal from said terminator detection means, delivering an ENABLE signal to said switching terminator to enable said switching terminator;

and, switchably connecting via terminator isolation means said switching terminator to said internal and external bus segments in accordance with at least one system signal sent front said CPU.

15. The method as set forth in claim 14, wherein providing said to terminator detection means comprises the steps of:

receiving an internal reset request signal via an internal reset request line coupled to a first input of a first NAND gate;

receiving an external reset request signal via an external reset request line coupled to a second input of said first NAND gate;

providing first voltage sensing means coupled to said first input of said first NAND gate for determining whether an internal terminator is connected to said internal reset request line;

and, providing second voltage sensing means coupled to said second input of said first NAND gate, for determining whether an external terminator is connected to said external reset request line.

16. The method as set forth in claim 15, wherein providing said first voltage sensing means comprises coupling a first pull-down 10 kilohm KΩ resistor to the first input of said NAND gate such that said internal reset request line is pulled to ground if a first terminator is connected to said internal reset request line.

17. The method as set forth in claim 16, wherein providing said second voltage sensing means comprises coupling a second pull-down 10 KΩ resistor to the second input of said first NAND gate such that said external reset request line is pulled to ground if a second terminator is connected to said external reset request line.

18. The method as set forth in claim 17, wherein providing said system signals comprises:

coupling a first system reset line from said CPU to said bidirectional switch means and transmitting a first system reset signal such that said bidirectional switch means opens;

and, coupling a second system reset line front said CPU to said switching terminator means and transmitting a second system reset signal such that said decision signal is stored after said bidirectional switch means has opened.

19. The method as set forth in claim 18, wherein providing said bidirectional switch means comprises the steps of:

providing a first transistor having a first base, a first collector, and a first emitter;

coupling said first base of said first transistor via a first resistor to said first system reset line, coupling the first collector of said first transistor to said internal reset request line, and coupling the first emitter of said first transistor to said external reset request line whereby said first transistor conducts current in a first direction between said internal and external bus segments;

providing a second transistor having a second base, a second collector, and a second emitter;

coupling said second base of said second transistor via a second resistor to said first system reset line, coupling the second collector of said second transistor to said external reset request line, and coupling the second emitter of said second transistor to said internal reset request line whereby said second transistor conducts current in a second direction between said internal and external bus segments, wherein said bidirectional switch means switchably connects said internal bus segment to said external bus segment.

20. The method as set forth in claim 19, wherein providing said first system reset signal comprises providing a SLOW RESET* signal, said bidirectional switch means opening when a logical HIGH-to-LOW transition of SLOW RESET* is received.

21. The method as set forth in claim 19, further comprising the steps of:

coupling a second NAND gate to receive said first system reset signal, said second NAND gate having an output;

coupling the output of said second NAND gate to said first and second resistors further coupled to said first and second transistors of said bidirectional switch means; and, receiving said first system reset signal comprising a SLOW RESET signal, said bidirectional switch means opening when a logical LOW-to-HIGH transition of SLOW RESET is received.

22. The method as set forth in claim 19, wherein providing said terminator enabling means comprises the steps of:

providing latching means coupled to the output of said first NAND gate;

receiving said DECISION signal in said latching means;

storing said DECISION signal in said latching means when said second system reset signal is received by a latch clocking means;

receiving the DECISION signal in an enable gate; and, generating an ENABLE signal disabling said switching terminator when said enable gate detects said first system reset signal.

23. The method as set forth in claim 21, wherein providing said terminator isolation means comprises:

providing a third transistor having a third base, a third collector, and a third emitter, said third base coupled via a third resistor to the output of said second NAND gate, said third collector coupled to said switching terminator;

decoupling said switching terminator from said internal reset request line via said third transistor when said SLOW RESET signal is inverted by said second NAND gate and is applied to said third base of said third transistor; and, coupling a third NAND gate to receive said second system signal, said third NAND gate having an output coupled to a latching input of said switching terminator.

24. The method as set forth in claim 22, wherein providing said second system reset signal comprises providing a FAST RESET* signal;

thereafter transmitting a TERMINATOR-LATCH signal via said third NAND gate to said latching input of said switching terminator when said FAST RESET* signal undergoes a LOW-to-HIGH transition;

inverting said FAST RESET* signal with said third NAND gate to form said TERMINATOR-LATCH signal; and, thereafter internally latching the DECISION signal in said switching terminator after a LOW-to-HIGH transition of FAST RESET* is received by said latching input of said switching terminator.

* * * * *